(12) United States Patent
Kobayashi et al.

(10) Patent No.: US 8,639,025 B2
(45) Date of Patent: Jan. 28, 2014

(54) MEASUREMENT APPARATUS AND CONTROL METHOD

(71) Applicant: Canon Kabushiki Kaisha, Tokyo (JP)

(72) Inventors: Kazuhiko Kobayashi, Yokohama (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 13/672,158

(22) Filed: Nov. 8, 2012

(65) Prior Publication Data

US 2013/0077854 A1 Mar. 28, 2013

Related U.S. Application Data

(63) Continuation of application No. 12/108,078, filed on Apr. 23, 2008, now Pat. No. 8,326,021.

(30) Foreign Application Priority Data

Apr. 26, 2007 (JP) ................................. 2007-117563

(51) Int. Cl.
*G06K 9/00* (2006.01)
(52) U.S. Cl.
USPC ............ 382/154; 382/107; 382/132; 382/294
(58) Field of Classification Search
USPC .................. 382/107, 132, 154, 294
See application file for complete search history.

(56) References Cited

U.S. PATENT DOCUMENTS

| 5,446,798 | A * | 8/1995 | Morita et al. | 382/154 |
|---|---|---|---|---|
| 5,973,699 | A * | 10/1999 | Kent | 345/419 |
| 6,664,121 | B2 * | 12/2003 | Grodnensky et al. | 438/16 |
| 7,239,312 | B2 * | 7/2007 | Urisaka et al. | 345/419 |
| 2001/0043738 | A1 * | 11/2001 | Sawhney et al. | 382/154 |
| 2006/0239538 | A1 * | 10/2006 | Sato et al. | 382/154 |
| 2006/0262141 | A1 * | 11/2006 | Satoh et al. | 345/633 |
| 2007/0242899 | A1 * | 10/2007 | Satoh et al. | 382/286 |
| 2007/0297695 | A1 * | 12/2007 | Aratani et al. | 382/284 |

FOREIGN PATENT DOCUMENTS

JP 09-167234 A 6/1997

OTHER PUBLICATIONS

The above reference was cited in a Jan. 18, 2013 Japanese Office Action, a copy of which is enclosed without an English Translation, that issued in Japanese Patent Application No. 2007-117563.

* cited by examiner

*Primary Examiner* — Vu Le
*Assistant Examiner* — Aklilu Woldemariam
(74) *Attorney, Agent, or Firm* — Cowan, Liebowitz & Latman, P.C.

(57) ABSTRACT

A measurement apparatus which measures the relative position and orientation of an image-capturing apparatus capturing images of one or more measurement objects with respect to the measurement object, acquires a captured image using the image-capturing apparatus. The respective geometric features present in a 3D model of the measurement object are projected onto the captured image based on the position and orientation of the image-capturing apparatus, thereby obtaining projection geometric features. Projection geometric features are selected from the resultant projection geometric features based on distances between the projection geometric features in the captured image. The relative position and orientation of the image-capturing apparatus with respect to the measurement object is then calculated using the selected projection geometric features and image geometric features corresponding thereto detected in the captured image.

7 Claims, 5 Drawing Sheets

MEASUREMENT APPARATUS AND CONTROL METHOD

CROSS-REFERENCE TO RELATED APPLICATION

This application is a continuation of application Ser. No. 12/108,078, filed Apr. 23, 2008, the entire disclosure of which is hereby incorporated by reference.

BACKGROUND OF THE INVENTION

1. Field of the Invention

The present invention relates to a measurement apparatus and a control method, in which a model of a measurement object is used to measure the position and orientation of an image-capturing apparatus as the image-capturing apparatus captures an image of the measurement object.

2. Description of the Related Art

Measurement of the position and orientation of an image-capturing apparatus, such as a camera capturing an image of real space (hereafter referred to as a camera as appropriate), is required, for instance, in mixed reality systems providing a combined display of real space and virtual space.

In the past, a method employing markers having known 3D positions was known as a method used for measuring the position and orientation of an image-capturing apparatus. In this method, the distance between the positions of markers detected in a captured image within the captured image and projected positions obtained by projecting the 3D positions of the markers onto an imaging plane based on the general position and orientation of the image-capturing apparatus is used as an error, and the position and orientation are estimated so as to optimize a target function that minimizes the error. Moreover, the markers employed are often provided with special easy-to-detect geometric or hue-related features.

Furthermore, there has been disclosed a method utilizing a model of the measurement object for position and orientation measurement, in which the structure of the measurement object is employed and the boundaries of planes constituting the measurement object are viewed as edges. It should be noted that the term "edge", as used herein, refers to a region in which considerable changes in density are observed in a captured image.

A method, in which the position and orientation are estimated with the help of line segments (called measurement line segments) as the geometric features of a measurement object, has been described by Tom Drummond and Roberto Cipolla in "Real-time visual tracking of complex structures", IEEE Transactions of Pattern Analysis and Machine Intelligence. Vol. 24, No. 7, pp. 932-946, 2002 (hereafter referred to as Document 1). Under this method, the three-dimensional positions of measurement line segments are projected onto an imaging plane, as viewed from the general position and orientation of an image-capturing apparatus, and the position and orientation are estimated by utilizing the distances between edges detected in the captured image and the projected measurement line segments as a target function.

An outline of this technique is provided below.

Using a general estimated position and orientation, measurement line segments from a measurement object are projected onto a captured image.

The positions of the edge regions, in which density undergoes local changes, are obtained by searching pixels in the captured image in the vicinity of the projected measurement line segments.

Optimization is carried out such that the distance between the projected measurement line segments and the position of the edge regions is reduced.

The value of the estimated position and orientation is updated.

Such position and orientation estimation based on using measurement line segments present in measurement objects has a wide range of applications because, so long as the target 3D model is known, it can be used as the measurement object of the measurement apparatus. In addition, during the above-mentioned estimation, the range of edge search within a captured image is limited to the image around the projected measurement line segments. Accordingly, this provides the advantage that processing time can be shortened in comparison with the method, in which the distance of the model is obtained upon detection of edges by image processing from the entire captured image. For this reason, it has been used for image-capturing apparatus alignment requiring real-time processing in the mixed reality, such as head position estimation and the like.

In Document 1, a measurement object of a relatively simple shape is used as the measurement object, and the distance between the image-capturing apparatus and the measurement object does not change much either. For this reason, little change occurs in the observed edges while slight changes take place in orientation of the measurement object model in the field of view, which makes estimation of position and orientation possible.

In real environments, the shadows etc. of measurement objects are often viewed as edges, which often makes position and orientation estimation unreliable. In L. Vacchetti, V. Lepetit and P. Fua, "Combining edge and texture information for real-time accurate 3D camera tracking", Proceedings of International Symposium on Mixed and Augmented Reality, pp. 48-57, 2004 (hereafter referred to as Document 2), one of multiple observed edges is associated with a measurement line segment and optimization calculations are carried out such that the distance between the associated edge and the measurement line segment projected on the imaging plane is minimized. In accordance with Document 2, in environments comprising edges other than the edges to be measured, robust position and orientation estimation can be performed by means of convergence carried out so as to minimize the error by repeatedly using the above-described association-related assumption.

Methods that have been proposed so far work well when the relative positional relationship between the measurement object and the image-capturing apparatus that views it does not change very much. However, problems arise when the image-capturing apparatus is combined with human motion, that is, when a person is holding the image-capturing apparatus itself and moving for the purpose of navigation, etc. These problems are due to the fact that considerable changes take place in the relative position of the measurement object and the image-capturing apparatus when a person walks around a building or outdoors.

Here, as an example, FIGS. 2A-2H illustrate a situation in which a person holding an image-capturing apparatus is walking along an indoor corridor. FIGS. 2A, 2C, 2E, and 2G represent edges of building structures, as viewed from the viewpoint position of a person walking inside. FIGS. 2B, 2D, 2F, and 2H are figures showing the indoor environment from above, wherein the black dot shows the position of the walking person and the triangle attached thereto shows the direction of gaze of the walking person. Overhead views obtained in the respective positions in FIGS. 2A, 2C, 2E, and 2G correspond to FIGS. 2B, 2D, 2E, and 2H.

If we look at the edge of the door in FIG. 2A and the edge of the door in FIG. 2C, we can see that despite the fact that we are looking at the same observed object, the same door, the configuration of the image geometric features that can be observed has changed due to the difference in the relative position of the viewpoint and the object. Furthermore, FIG. 2E and FIG. 2G illustrate a situation in which the walking person quickly looks back in the direction the person had come from. As can be seen, at such time, the object viewed by the walking person abruptly changes from the edges of a proximate door to the edges of a corridor stretching away. Thus, the viewpoint changes illustrated in FIGS. 2A, 2C, 2E, and 2G frequently occur in applications, in which the measurement object is an indoor or outdoor structure and the image-capturing apparatus is carried around.

When the relative position of the observed object and image-capturing apparatus changes, problems arise in projection onto a captured image and geometric features of the measurement object. Namely, when viewing detailed geometric features located relatively far from the image-capturing apparatus, the spacing between projection geometric features proximate each other on the projection image narrows down, and, in certain situations, multiple geometric features may be projected within less than 1 pixel. In order to handle such circumstances, it is contemplated to switch geometric features in accordance with the relative positional relationship of the geometric features and the image-capturing apparatus, but it is necessary to set the relationship between the relative position of the geometric features and the image-capturing apparatus in advance in a systematic fashion.

However, the task that arises in environments such as corridors, where one can glance back, is to delay switching between multiple models. Moreover, basically, it is difficult to detect segments smaller than one pixel in captured images. For this reason, when proximate geometric features are far away, it becomes difficult to detect both image geometric features in the respective projection geometric features within a captured image, which affects the results of estimation. At the same time, it becomes more difficult to implement efficient processing because image geometric feature search regions obtained from the proximate projection geometric features overlap.

Furthermore, nonlinear calculations have to be repeatedly carried out during optimization calculations used to obtain the position and orientation. For this reason, when a lot of time is spent on processing such as image geometric feature detection and the like, iteration is stopped before sufficient accuracy is reached. This is undesirable in mixed reality technology, which requires real-time processing at the video frame rate and accuracy of position and orientation.

SUMMARY OF THE INVENTION

The present invention was made with account taken of the above-described problems and provides a measurement apparatus and method that make it possible to efficiently obtain the position and orientation of an image-capturing apparatus without being affected by the relative position relationship between the image-capturing apparatus and measurement object.

According to one aspect of the present invention, there is provided a measurement apparatus for measuring relative position or orientation of an image-capturing apparatus adapted to capture images of one or more measurement objects with respect to a measurement object, wherein the measurement apparatus comprises: an image acquiring unit configured to acquire a captured image from the image-capturing apparatus; a projection unit configured to project geometric features of a 3D model of the measurement object onto the captured image based on a position and orientation of the image-capturing apparatus to obtain projection geometric features; a selecting unit configured to select projection geometric features to be used in calculation of the position or orientation from the projection geometric features obtained by the projection unit based on distances with respect to the projection geometric features in the captured image; and a calculating unit configured to calculate the relative position or orientation of the image-capturing apparatus with respect to the measurement object using the projection geometric features selected by the selecting unit and image geometric features corresponding to the selected projection geometric features detected in the captured image.

According to one aspect of the present invention, there is provided a control method for a measurement apparatus measuring the relative position or orientation of an image-capturing apparatus adapted to capture images of one or more measurement objects with respect to a measurement object, wherein the method comprises: acquiring a captured image from the image-capturing apparatus; projecting respective geometric features of a 3D model of the measurement object onto the captured image based on a position and orientation of the image-capturing apparatus to obtain projection geometric features; selecting projection geometric features to be used in calculation of the position or orientation from the projection geometric features obtained based on distances with respect to the projection geometric features in the captured image; and calculating the relative position or orientation of the image-capturing apparatus with respect to the measurement object using the projection geometric features selected and image geometric features corresponding to the selected projection geometric features detected in the captured image.

Further features of the present invention will become apparent from the following description of exemplary embodiments with reference to the attached drawings.

DESCRIPTION OF THE EMBODIMENTS

Below, preferred embodiments of the present invention are explained in detail with reference to the accompanying drawings.

Embodiment 1

Figure 1:
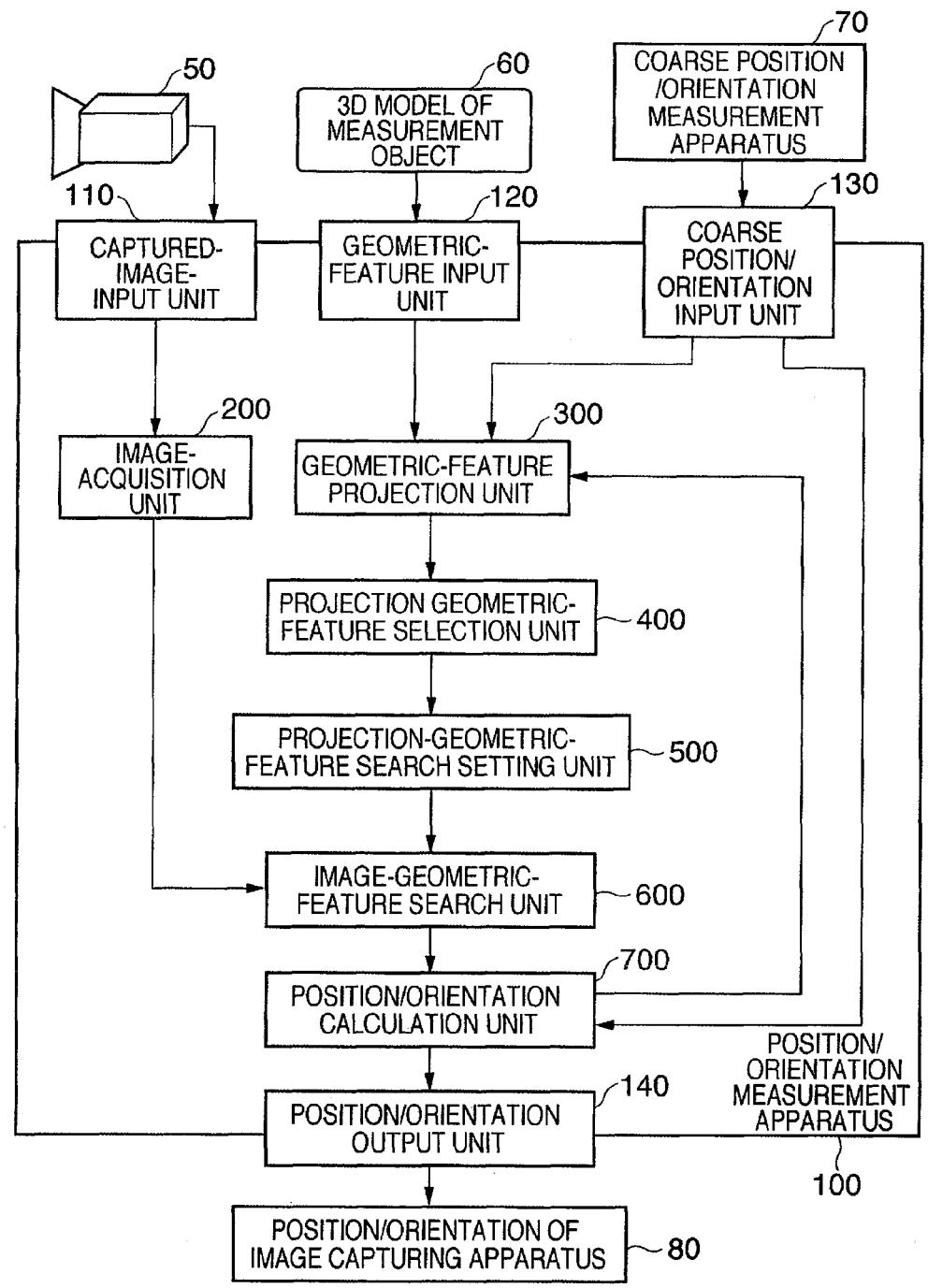
FIG. 1 is a diagram illustrating a functional configuration of the measurement apparatus according to Embodiment 1.
Figure 2A:
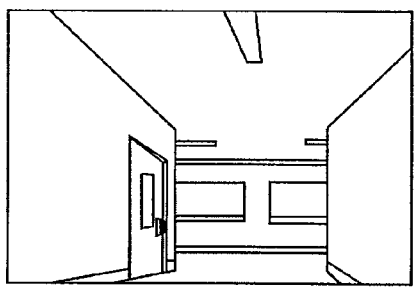
FIGS. 2A-2H illustrate differences in the distribution of image geometric features viewed while the viewpoint changes.
Figure 2B:
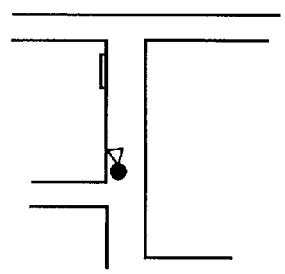
Figure 2C:
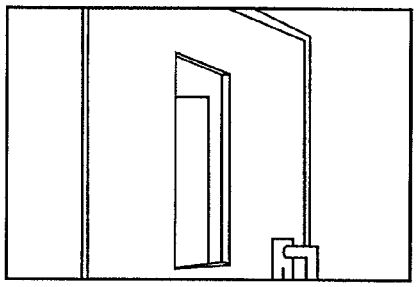
Figure 2D:
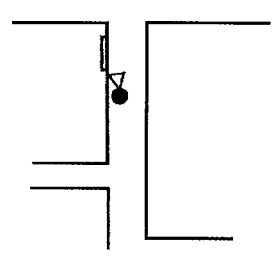
Figure 2E:
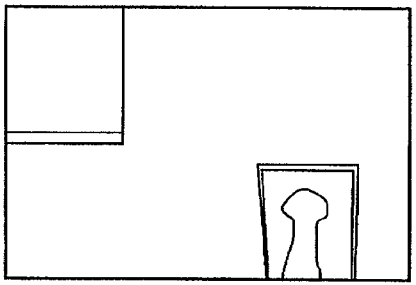
Figure 2F:
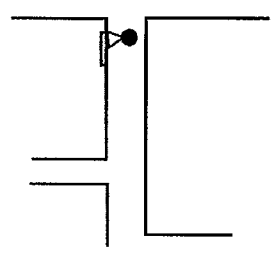
Figure 2G:
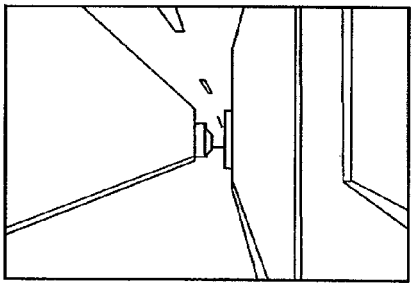
Figure 2H:
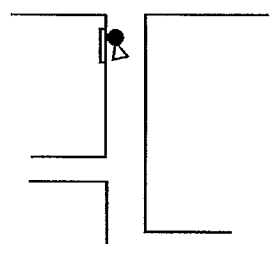

FIG. 1 is a block diagram showing a measurement apparatus 100 and an image-capturing apparatus 50. FIG. 1 illustrates the flow of processing and data flow in the measurement apparatus 100. It should be noted that the configuration of the measurement apparatus 100 shown below is partially or entirely implemented as a result of execution of a control program stored in a ROM or RAM, not shown, by a CPU, not shown. In other words, the measurement apparatus 100 may be implemented by executing a control program executing the hereinafter described processing on a regular computer.

In the measurement apparatus 100 of the present embodiment, an image-capturing apparatus 50, which captures images of a scene, and a coarse measurement apparatus 70 (marked "coarse position/orientation measurement apparatus" in the figures), which acquires the general position and orientation of the image-capturing apparatus 50, are connected via a captured-image-input unit 110 and a coarse input unit 130 (marked "coarse position/orientation input unit" in the figures). Moreover, a 3D model 60 of a measurement object, which describes geometric features used for measurement object alignment, is acquired from a geometric-feature input unit 120. The geometric-feature input unit 120 may be configured to accept as input (read) the 3D model 60 from loaded storage media or may be configured to accept the 3D model 60 as input from outside via a network etc. The purpose of the measurement apparatus 100 is to use captured image information to obtain the relative position and orientation of the image-capturing apparatus 50 with respect to the measurement object when the image-capturing apparatus 50 is capturing an image of a scene comprising the measurement object described by the 3D model 60 of the measurement object.

It should be noted that in the present embodiment, the condition that permits position and orientation estimation by the measurement apparatus 100 is that an image of said measurement object is included in a captured image of a scene captured by the image-capturing apparatus 50. It should be noted that when there is no image of said measurement object in the captured image, the measurement values of the coarse measurement apparatus 70 may be used "as is".

The image-capturing apparatus 50 is a 2D image-capturing apparatus utilizing photoelectric conversion elements constituted by CCD or CMOS elements. Moreover, the image-capturing apparatus 50 sends a video signal to the measurement apparatus 100 via the captured-image-input unit 110. The captured-image-input unit 110 is configured to permit transmission of video signals via a signal cable (line) or wirelessly. Furthermore, it may take a form, in which the image-capturing apparatus 50 is incorporated into the measurement apparatus 100 or a form, in which an arrangement implementing processing by the measurement apparatus 100 is incorporated into the processor of the image-capturing apparatus 50.

The 3D model 60 of the measurement object is a model including the 3D geometric information of the measurement object and comprises geometric features detected as edges in images captured by the image-capturing apparatus 50. Generally speaking, it is possible to use CAD and other design data as the 3D model 60. Moreover, it is also possible to configure it so as to permit input of values measured by measurement devices as a 3D model. It should be noted that commercially available 3D measurement applications may be used for editing the 3D model. Furthermore, the edges of wall surfaces and doors in the building can also be measured with measurement instruments. In the present embodiment, it is assumed that the target measurement object is provided on storage media that can be attached to and removed from the measurement apparatus 100 in order allow the measurement apparatus 100 to switch measurement objects. Accordingly, the geometric-feature input unit 120 of the measurement apparatus 100 is furnished with an interface capable of reading data from the removable storage media.

On the other hand, when handling an existing fixed measurement object, 3D model information may be incorporated into the measurement apparatus 100 using nonvolatile memory or storage media. Namely, the 3D model 60 of the measurement object may be somehow provided to the measurement apparatus 100 prior to carrying out measurement. Accordingly, it may be specified by multiple 3D model data stored on external storage media as well as acquired from a remote server via a network.

Furthermore, since the measurement apparatus 100 may contain geometric-feature data detectable from captured images, the measurement apparatus 100 may be configured to comprise a processing unit used for converting various 3D-model data formats.

The coarse measurement apparatus 70 is an apparatus used to provide the general position and orientation of the image-capturing apparatus 50. An apparatus can be used that measures 6 DoF (six degrees of freedom), that is, position and orientation of a sensor in a space using magnetic fields or ultrasonic waves. It should be noted that it is also possible to utilize the coarse position and orientation of the image-capturing apparatus 50 obtained by disposing markers with graphical features located in known positions and detecting these markers from the captured images.

Moreover, since it is sufficient to understand the general relative position and orientation of the image-capturing apparatus 50 with respect to the measurement object, once a highly accurate position and orientation can be obtained using the measurement apparatus 100, these position and orientation results can be utilized in the future. Accordingly, if position and orientation measurement is initiated after placing the image-capturing apparatus 50 in a predetermined initial position, the coarse measurement apparatus 70 can be rendered unnecessary. In this manner, methods used for obtaining the coarse position and orientation do not impose constraints on the working of the present invention and the position and orientation may be acquired using any methods.

The configuration of the position and orientation measurement apparatus 100 will be explained next.

The position and orientation measurement apparatus 100 is composed of an input unit used for inputting information from other devices, a processing unit used for estimating the relative position and orientation of the image-capturing apparatus with respect to the measurement object based on information from the input unit, and an output unit used for outputting the position and orientation of the image-capturing apparatus so that it can be used by other devices. The captured-image-input unit 110, which is a unit used for input, the geometric-feature input unit 120, and the coarse input unit 130 are explained below.

First of all, explanations will be provided with regard to the configuration of the image-capturing apparatus 50 used to acquire captured images. The image-capturing apparatus 50 is connected to the measurement apparatus 100 by the captured-image-input unit 110. In the present embodiment, it is assumed that the captured-image-input unit 110 has a connector used for video signal input, which is connected to a video output terminal on the image-capturing apparatus 50 that conforms to video signal output specifications.

Next, explanations will be provided regarding the reading of the 3D model 60 of the measurement object. It is presumed that the format of the 3D model 60 is a format that the measurement apparatus 100 supports. It should be noted that, in the case of handling design CAD data, the geometric-feature input unit 120 is provided with the corresponding CAD format analysis capability, which makes it possible to handle any model data. It is assumed that, from respective model formats, it extracts and holds what corresponds to the image geometric features, whereby the measurement object used for estimating the position and orientation of the apparatus is detected in the captured image. In other words, the geometric-feature input unit 120 selects the model of the measurement object present in the captured image based on the position and orientation of the image-capturing apparatus 50 according to the coarse measurement apparatus 70, and holds it.

In the present embodiment, it is assumed that the geometric features are comprised of one or more line segments and contain at least two points, that is, a 3D start point and end point, for each line segment. It should be noted that, as described below, both the start and the end point may be generated by clipping. If the coordinates of each point constituting a line segment are expressed in the model coordinate system established by the geometric features, they can be matched to real space by referring to the position and orientation in the model coordinate system and the scaling factor used during expansion to the actual spatial scale.

The acquisition of the coarse position and orientation from the coarse measurement apparatus 70 will be explained next. It is assumed that the coarse measurement apparatus 70 measures the general position and orientation of the image-capturing apparatus based on information from sensors moving along with the image-capturing apparatus 50. In the present embodiment, it is assumed that the information of the coarse measurement apparatus 70 is acquired via serial communications. The coarse input unit 130 acquires the general position and orientation of the image-capturing apparatus 50, in which the sensors are installed, from the coarse measurement apparatus 70 via serial communications. Furthermore, offset adjustment may be performed on appropriate sensors in the coarse input unit 130 or coarse measurement apparatus 70.

Processing involved in the estimation of position and orientation by the measurement apparatus 100 in the present embodiment is explained next.

By referring to the horizontal synchronizing signal and vertical synchronizing signal, the image-acquisition unit 200 samples the captured image, that is, the video signal of the image-capturing apparatus 50, which is transmitted via the captured-image-input unit 110, and saves the captured image as 2D image data. It is assumed that processing performed by each unit of the measurement apparatus 100 is carried out in sync with the image capture timing of the image-capturing apparatus 50. A video synchronizing signal output from the image-capturing apparatus 50 may be used for confirmation of image capture timing. Moreover, while it is desirable to use low-distortion optical elements in the image-capturing apparatus 50, when optical elements exhibiting distortion are used, the distortion of the lens may be calibrated in advance and used to perform correction. More specifically, the image-acquisition unit 200 holds parameters that approximate the distortion of the lens being used in the form of a mathematical model. When another processing unit (e.g. image-geometric-feature search unit 600) checks the pixel density of the captured image, the image-acquisition unit 200 uses the parameters being held to correct the distortion and supply the pixel density. In this manner, the processing unit checking the pixel density can check the density at pixel locations corrected based on the lens distortion correction formula, which also makes it possible to maintain the linearity of edges in captured images in the range of distortion that permits approximation.

Processing performed by a geometric-feature projection unit 300 in the measurement apparatus 100 in the present embodiment is explained next. As used herein, a "geometric feature" is assumed to be composed of two points: a start point and an end point. Moreover, the coordinate system of the geometric features is assumed to have been converted to a reference coordinate system-based representation.

The coordinates of a dot in the reference coordinate system $[x_w, y_w, z_w]^T$ and coordinates $[u_x, u_y]$ in a captured image in the camera coordinate system are related in the following way using a matrix P of a perspective projection transformation.

$$h \begin{pmatrix} u_x \\ u_y \\ 1 \end{pmatrix} = P \begin{pmatrix} x_w \\ y_w \\ z_w \\ 1 \end{pmatrix} \quad \text{[Equation 1]}$$

Here, h is obtained as a homogeneous coordinate transformation representation and $[u_x u_y]^T$ is calculated using the obtained h. Moreover, if a matrix R (3×3 matrix), whose elements are $R_{11}$, $R_{12}$, $R_{13}$, $R_{21}$, $R_{22}$, $R_{23}$, $R_{31}$, $R_{32}$, and $R_{33}$, is an orientation rotation matrix in the reference coordinate system and $t=[t_x, t_y, t_z]$ is a parallel translation vector, then P in the equation above can be expressed in the following manner.

$$P = \begin{pmatrix} -f_x & 0 & p_x & 0 \\ 0 & -f_y & p_y & 0 \\ 0 & 0 & 1 & 0 \end{pmatrix} \begin{pmatrix} R & t \\ 0\ 0\ 0 & 1 \end{pmatrix} \quad \text{[Equation 2]}$$

$$= \begin{pmatrix} -f_x & 0 & p_x & 0 \\ 0 & -f_y & p_y & 0 \\ 0 & 0 & 1 & 0 \end{pmatrix} \begin{pmatrix} R_{11} & R_{12} & R_{13} & t_x \\ R_{21} & R_{22} & R_{23} & t_y \\ R_{31} & R_{32} & R_{33} & t_z \\ 0 & 0 & 0 & 1 \end{pmatrix}$$

Here, $f_x$, $f_y$ are focal lengths in the horizontal and vertical direction and $p_x$, $p_y$ are principal point coordinates in the horizontal and vertical direction.

If parameters related to the distortion of the optical elements used in the image-capturing apparatus 50 have been calibrated in advance, then the parameters $f_x$, $f_y$ and $p_x$, $p_y$ among the parameters of the equation above become known values. Furthermore, although R, which is the orientation component of the camera, has nine components, it is sufficient to use a representation produced by rotation about three independent vectors. Accordingly, rotational transformation is represented using a method, in which the angle of rotation about the axis of rotation is represented by three variables. Namely, if the vector of a rotational axis is $\lfloor r_x\ r_y\ r_z \rfloor$ and the angle of rotation is $r_a$, then the rotation matrix R will be represented as follows.

$$R = \begin{bmatrix} r_x^2(1-\cos r_a) + \cos r_a & r_x r_y(1-\cos r_a) - r_z \sin r_a & r_z r_x(1-\cos r_a) + r_y \sin r_a \\ r_x r_y(1-\cos r_a) + r_z \sin r_a & r_y^2(1-\cos r_a) + \cos r_a & r_y r_z(1-\cos r_a) + r_x \sin r_a \\ r_z r_x(1-\cos r_a) + r_y \sin r_a & r_y r_z(1-\cos r_a) + r_x \sin r_a & r_z^2(1-\cos r_a) + \cos r_a \end{bmatrix} \quad \text{[Equation 3]}$$

It should be noted that on the condition that, with respect to the axis of rotation, $r_x^2+r_y^2+r_z^2=1$, and the orientation is ω, then the following equation will be true:

$$\omega=[\omega_x,\omega_y,\omega_z]=[r_xr_a,r_yr_a,r_zr_a]. \qquad \text{[Equation 4]}$$

The start points and end points of geometric features can be subjected to perspective projection transformation and transformed to points within a captured image in the camera coordinate system.

Actually, captured images are obtained by sampling light that forms images on imaging elements such as a CCD or a CMOS through optical elements. For this reason, the range of imaging elements is predetermined. The geometric-feature projection unit 300, as a result of perspective projection transformation calculations, holds only geometric features whose start point or an end point is contained in the captured image region. When only one point, that is, either the start point or the end point, of a geometric feature is comprised within the captured image region, the point of intersection of said line segment with the boundary of the captured image region is used as a new start point or end point. Such processing is typical processing called "clipping" in computer graphics.

Furthermore, in a real environment, projection geometric features sometimes exist in locations where they are obscured by other objects and cannot be observed. In such cases, as described in the above-mentioned Document 1, it is possible to determine whether projection geometric features can be observed using information on 3D model surfaces comprised of multiple geometric features.

The projection geometric-feature selection unit 400 will be explained next. The projection-geometric-feature selection unit 400 subjects the respective geometric features projected by the geometric-feature projection unit 300 to processing that determines whether to use them for position and orientation calculation based on distances between geometric features onscreen (in the captured image).

First of all, the projection-geometric-feature selection unit 400 obtains the distance to a projection geometric feature in the captured image. Here, explanations will be provided for the i-th projection geometric feature. The i-th projection geometric feature has its start point at $Ps(i)=[xs_i, ys_i]^T$ and its end point at $Pe(i)=[xe_i, ye_i]^T$. The distance $D_i$ to the projection geometric feature in the captured image is calculated in the following manner.

$$D_i=\sqrt{(Ps(i)-Pe(i))^2}=\sqrt{(xs_i-xe_i)^2+(ys_i-ye_i)^2} \qquad \text{[Equation 5]}$$

When the distance $D_i$ is shorter than a predetermined threshold value D', it is determined that said projection geometric feature will not be used for processing intended for obtaining the distance to the subsequent edge. On the other hand, when it has a length equal to or greater than D', it is assumed that said projection geometric feature will subsequently be used in position and orientation estimation processing based on edge distance.

It should be noted that when the position and orientation are subject to slight changes, the projected length remains almost the same, which permits efficient processing based on caching the value of the distance $D_i$ when the position and orientation estimation processing is repeated.

Furthermore, in the present embodiment, a determination is made as to using said projection geometric feature based on the mutual distance between said projection geometric feature and other projection geometric features. In the present embodiment, distance to the start point and end point of the projection geometric features that have been selected for use among projection geometric features processed up to the (i−1)th one is obtained for the start point Ps(i) and end point Pe(i) of the i-th projection geometric feature that has been subjected to projection transformation. It should be noted that the start point Ps(i) and end point Pe(i) of the i-th projection geometric feature are, respectively, $Ps(i)=[xs_i, ys_i]^T$ and $Pe(i)=[xe_i, ye_i]^T$. The shortest distance is then compared with a predetermined threshold value and it is determined that distances smaller than the threshold value will not be used.

As a result of the processing described above, among the parallel and adjacent projection geometric features in the projection image, the line segments that are proximate line segments already selected for use, or those determined to have a length equal or less than D', are not used. As a result of carrying out these selection operations, the frequency of value checking in image regions where the hereinafter-described edge search in captured images is performed is reduced and efficient processing can be carried out. Furthermore, the use of the overlapping of the edge search regions of adjacent projection geometric features makes it possible to dynamically process observed edge changes due to changes in the positional relationship between the image-capturing apparatus and the measurement object. Furthermore, as a result of not using line segments judged to have a length equal or less than D', line segments that do not allow for sufficient information to be obtained for determining line segment direction are excluded from items subject to calculation.

Next, the projection-geometric-feature search setting unit 500 calculates points for carrying out edge search in the captured image for projection geometric features selected for use by the projection-geometric-feature selection unit 400 among the projection geometric features that have been subjected to perspective projection transformation by the geometric-feature projection unit 300. The setting of search start points and search corresponding points (search end points) for image geometric features by the projection-geometric-feature search setting unit 500 will be explained next with reference to FIG. 3.

Figure 3:
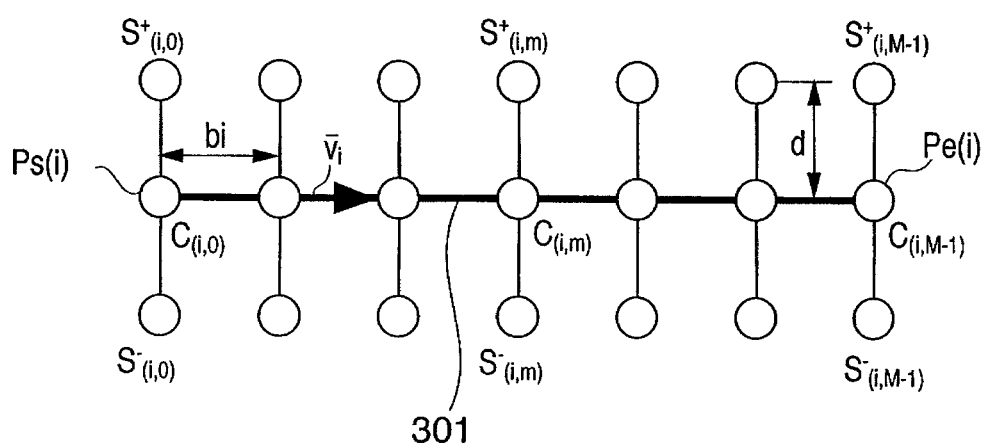
FIG. 3 is a diagram explaining search start points and search corresponding points of image geometric features used in the measurement apparatus of Embodiment 1.

In FIG. 3, explanations will be provided for the i-th projection geometric feature (projection measurement line segment in this embodiment) 301. The i-th projection geometric feature 301 has its start point at $Ps(i)=[xs_i, ys_i]^T$ and its end point at $Pe(i)=[xe_i, ye_i]^T$. The vector $v_i$ that connects Ps(i) and Pe(i) is expressed by:

$$v_i=[xe_i-xs_i,ye_i-ys_i]^T \qquad \text{[Equation 6]}$$

and the normalized vector is expressed by:

$$\overline{v}_i = \frac{v_i}{|v_i|}. \qquad \text{[Equation 7]}$$

Next, equidistant search start points $c_{(i,m)}$ are set up along the line segment connecting Ps(i) and Pe(i). Here, the range of m is from 0 to $M_i$, with the $M_i$ obtained in accordance with the following formula using a predetermined search segment interval B.

$$M_i = \left[\frac{|v_i|}{B}\right] \qquad \text{[Equation 8]}$$

In the formula above, [ ] (Gauss symbol represents the greatest integer that does not exceed a given number. Using the resultant $M_i$, the actual search interval $b_i$ will be:

$$b_i = \frac{|v_i|}{M_i}.$$ [Equation 9]

The search start points $c_{(i,m)}$ will then be expressed by:

$$c_{(i,m)} = Ps(i) + mb_i \bar{v}_i.$$ [Equation 10]

A search for edges in the captured image is carried out in a direction normal to the measurement line segment from the search start points $c_{(i,m)}$. A search range is a line segment region starting from each of the search start points $c_{(i,m)}$ and extending to the search corresponding points $s^+_{(i,m)}$ and $s^-_{(i,m)}$, with the search for edges, that is, image geometric features, carried out across this line segment region. If the normal vector of the normalized vector $\bar{v}_i$ of the projection measurement line segment is $\bar{v}_{\perp i}$, then the relationship:

$$\bar{v}_i \cdot \bar{v}_{\perp i} = 0$$ [Equation 11]

will be true. Below, the above-mentioned normal vector is also designated as the "normalized normal vector $v_{\perp i}$".

If the distance from a search corresponding point to a search start point is d, the position of the search corresponding point $s^+_{(i,m)}$ will be:

$$s^+_{(i,m)} = c_{(i,m)} - d\bar{v}_\perp,$$ [Equation 12]

and that of the search corresponding point $s^-_{(i,m)}$ on the opposite side will be:

$$s^-_{(i,m)} = c_{(i,m)} - d\bar{v}_\perp.$$ [Equation 13]

It should be noted that while the direction of the normalized normal vector $v_{\perp i}$ here is set to normal to the projection geometric feature, it is sufficient to set the search direction to a direction permitting image geometric feature search in the vicinity of the projection geometric feature.

Specifically, it is possible to use a vector obtained by quantizing the normalized normal vector $v_{\perp i}$ in four directions, that is, up, down, left, and right, or in eight directions, additionally including up-right, down-right, up-left, and down-left. Selecting normalized vector directions that have a small difference relative to the normalized normal vector $v_{\perp i}$ makes it possible to efficiently process image geometric feature searches.

Furthermore, it is also possible to describe the geometric feature search direction in the 3D model in advance and use a vector produced by subjecting the search direction to perspective projection transformation.

The image-geometric-feature search unit 600 detects image geometric features based on the pixel density between the search start points and search corresponding points set by the projection-geometric-feature search setting unit 500 in a captured image obtained from the image-acquisition unit 200. For instance, it detects points where the density of adjacent pixels that have been read is characterized by a significant density gradient of (points exceeding a predetermined threshold value) and holds the position of the pixels of interest at such time as the image geometric feature detection position.

Furthermore, an efficient way to increase the overall efficiency of processing is to refer to the time elapsed since the moment when an image is acquired by the image-acquisition unit 200 and determine whether the elapsed time exceeds a predetermined value, with the detection processing set up to be interrupted if it exceeds it.

The calculation unit 700 (marked "position/orientation calculation unit" in the figures) calculates and updates the relative position and orientation of the measurement object and image-capturing apparatus based on the distance between the positions of the image geometric features detected by the image-geometric-feature search unit 600 in the captured image and the positions of the projection measurement line segments of the measurement object corresponding thereto. Here, explanations will be provided regarding the process of calculation and updating of the position and orientation of the image-capturing apparatus by the calculation unit 700.

The updated position and orientation of the image-capturing apparatus can be obtained by carrying out optimization calculations so as to reduce the difference between the projected positions of the geometric features of the measurement object observed from the estimated position and orientation and the observed positions of the image geometric features in the actual captured image plane. In the present embodiment, as described above, measurement line segments are used as the geometric features.

Here, the distance between the observed positions of the image geometric features and the projected positions of the geometric features of the measurement object is regarded as an error and used as an error function E. The error function E accepts the position of the camera $t = [t_x \ t_y \ t_z]^T$, its orientation in terms of the angle of rotation about the axis of rotation $\omega = [\omega_x \ \omega_y \ \omega_z]^T$, and the position of an observed target point in the reference coordinate system $x_w = [x_w \ y_w \ z_w]^T$ as input.

If the projected position is $u' = [u'_x \ u'_y]^T$ and the observed position is $u = [u_x \ u_y]$, then the error function for the captured image can be represented by their difference.

$$E(t_x, t_y, t_z, \omega_x, \omega_y, \omega_z, x_w, y_w, z_w) = u' - u$$ [Equation 14]

Generally speaking, the relationship between the position and orientation and the position of an observed target point is nonlinear, which is why the error function E represented by the formula above is also a nonlinear function with respect to input. Due to the use of line segments as projection geometric features in the present embodiment, a projection point that matches an observed point $u = [u_x \ u_y]^T$ detected by edge search with an intersection point obtained by drawing a normal from this point to the projected line segment is $u'' = [u''_x \ u''_y]^T$. In such a case, $$E'(t_x, t_y, t_z, \omega_x, \omega_y, \omega_z, x_w, y_w, z_w) = u'' - u$$ [Equation 15]

is used as the error function.

If a first-order Taylor expansion is used for linear approximation of the formula above in the range, within which the position and orientation of the image-capturing apparatus undergo slight changes, the formula can be rewritten in the following manner.

$$E'(t_x, t_y, t_z, \omega_x, \omega_y, \omega_z, x_w, y_w, z_w) \cong \qquad \text{[Equation 16]}$$
$$E'_0 + \frac{\partial E'}{\partial t_x}\Delta t_x + \frac{\partial E'}{\partial t_y}\Delta t_y + \frac{\partial E'}{\partial t_z}\Delta t_z + \frac{\partial E'}{\partial \omega_x}\Delta \omega_x +$$
$$\frac{\partial E'}{\partial \omega_y}\Delta \omega_y + \frac{\partial E'}{\partial \omega_z}\Delta \omega_z + \frac{\partial E'}{\partial x_w}\Delta x_w + \frac{\partial E'}{\partial y_w}\Delta y_w + \frac{\partial E'}{\partial z_w}\Delta z_w$$

$E_0'$ represents the difference between the projected position and observed position when the position of the camera $t^0 = [t_x^0 \ t_y^0 \ t_z^0]^T$, its orientation $\omega^0 = [\omega_x^0 \ \omega_y^0 \ \omega_z^0]^T$, the target point coordinates $x_w^0 [x_w^0 \ y_w^0 \ z_w^0]^T$, and the observation position $u^0 = [u_x^0 \ u_y^0]^T$ are substituted in the formula, that is, the error. As a result, in the vicinity of $t^0$, $\omega^0$, and $x^0$, $\Delta t_x$, $\Delta t_y$, $\Delta t_z$, $\Delta \omega_x$, $\Delta \omega_y$, $\Delta \omega_z$, $\Delta x_w$, $\Delta y_w$, and $\Delta z_w$ are obtained using the linearized formula and added as correction values to $t^0$, $\omega^0$, and $x^0$, thereby making it possible to reduce the error.

Since the number of equations usually does not match the number of variables, the correction values $\Delta$ are obtained by the least squares method using information on a large number of reference points. Accordingly, a correction formula Δ is derived. First of all, if a matrix containing partial derivatives of variables is designated as J, a correction vector Δ, and an error vector E', then, based on the formula above, we can write:

$$J\Delta = E'. \quad \text{[Equation 17]}$$

By multiplying the left and right portions of the equation by a transposed matrix $J^T$ of J, the formula of the correction vector 4 can be expressed as follows.

$$\Delta = (J^T J)^{-1} J^T E' \quad \text{[Equation 18]}$$

Performing updates until the value of the correction vector Δ decreases makes it possible to obtain a highly accurate position and orientation. While the method described above illustrates a solution based on the Newton method, the optimization calculations may obviously be performed using other methods.

It should be noted that well-known nonlinear optimization techniques can be applied in the present embodiment because it is sufficient to be able to reduce the distance in the observed image between the positions of the image geometric features and the projection geometric features obtained by projecting the geometric features of the measurement object onto the captured image. For instance, a method where, for a general estimated position and orientation, there is generated a large number of random combinations exhibiting slight differences in the vicinity of the variable values, errors are obtained for the respective combinations, and combinations with small error values are utilized.

Moreover, it is assumed that if an error processed by the calculation unit 700 is below a predetermined value, the position and orientation estimation based on the corresponding captured image is terminated, and the results (position and orientation of image-capturing apparatus 80) are output by the output unit 140. If the error is greater than the predetermined value, an updated position and orientation is passed on to the geometric-feature projection unit 300, and edge search result-based position and orientation estimation is carried out using the updated position and orientation. If the number of updates performed in the calculation unit 700 exceeds a predetermined value, it means that the estimation of the position and orientation did not go smoothly. In such a case, in the present embodiment, the values of the coarse input unit 130 are output to the output unit 140. Based on such processing, the measurement apparatus 100 can output position and orientation calculation results, although they represent low-accuracy coarse position and orientation. At such time, a value indicating whether the position and orientation has been accurately determined can also be output to the output unit 140. By doing so, the apparatus may be adapted to allow the user of the measurement apparatus 100 to determine whether the output position and orientation measurement values have been corrected to a high level of accuracy. For instance, in applications utilizing mixed reality technology it is assumed that position and orientation measurement is carried out continuously and information indicating that the position and orientation measurement process has not succeeded makes it possible to modify processing performed by an application.

It should be noted that while the explanations provided above concerned a case, in which all the six parameters of position and orientation were obtained, the same techniques apply to cases, in which some of the parameters are obtained by other means, followed by obtaining the rest of the parameters. For instance, cases in which the orientation is obtained in an environment where the image-capturing apparatus is mounted on a tripod, or cases, in which the four parameters of position and orientation are optimized using measured values inclination angles produced by sensors measuring inclination with respect to the axis of gravity can be handled in a similar manner.

It should be noted that while the above-described Embodiment 1 illustrated a case, in which line segments of a 3D model constituting a measurement object were used as geometric features, the use of line segments is not mandatory in actual practice. For instance, the present invention can be applied even if the geometric features are dots, circles, ovals, etc.

For instance, if the geometric features are dots, their distribution in the projection image changes depending on the relative position of the image-capturing apparatus and measurement object. If the distance between dots already projected onto the projection image and the projected dots of said geometric features in the captured image is less than one pixel, then it will be difficult to separate and detect the respective image geometric features. For this reason, the problem can be solved by performing the same processing as in the above-described embodiment in the projection-geometric-feature selection unit 400 used in the present embodiment.

As described above, in accordance with Embodiment 1, geometric features intended for use in position and orientation calculations are appropriately selected based on the positional relationship of the projected geometric features. For this reason, it becomes possible to obtain the position and orientation of the image-capturing apparatus in an efficient manner without being affected by the relative position of the image-capturing apparatus and measurement object.

Embodiment 2

The above-described Embodiment 1 described a method, in which a search is carried out in a captured image for image geometric features corresponding to the positions of projection geometric features and position and orientation is estimated so as to decrease the distances therebetween. The ordinary Sobel operator and Canny operator can be uses in the detection of line segments carried out during the detection of image geometric features in captured images. Here, line segments detected by image processing in captured images (referred to as edges as appropriate) are called edge elements.

As far as the matching of projection geometric features and edge elements is concerned, assuming that a coarse position and orientation has been obtained, the edges possessing similar length, direction, etc. among edges located in the vicinity of the projection geometric features can be associated and position and orientation can be estimated so as to reduce the distances to these edge elements. In this case, redundant association processing can be reduced by making decisions regarding the use of geometric features in accordance with distances in the captured image.

Embodiment 3

When the measurement object is a 3D model having huge line segments, such as a model describing an entire building structure, the geometric features required for position and orientation estimation are subject to considerable variation depending on the distance between the image-capturing apparatus 50 and the measurement object. For this reason, if processing cannot be performed in an efficient manner, it becomes difficult to carry out position and orientation estimation within the imaging interval of the camera. In actual practice, in the captured image, the geometric features required for the estimation of position and orientation may possess a certain length and may have various directions.

Accordingly, processing that takes into consideration the sequence of processing of the geometric features required for position and orientation estimation makes it possible to process huge geometric features while maintaining the accuracy of position and orientation because the processing of the geometric features required for position and orientation estimation is completed even of the image geometric feature search process is interrupted.

Figure 4:
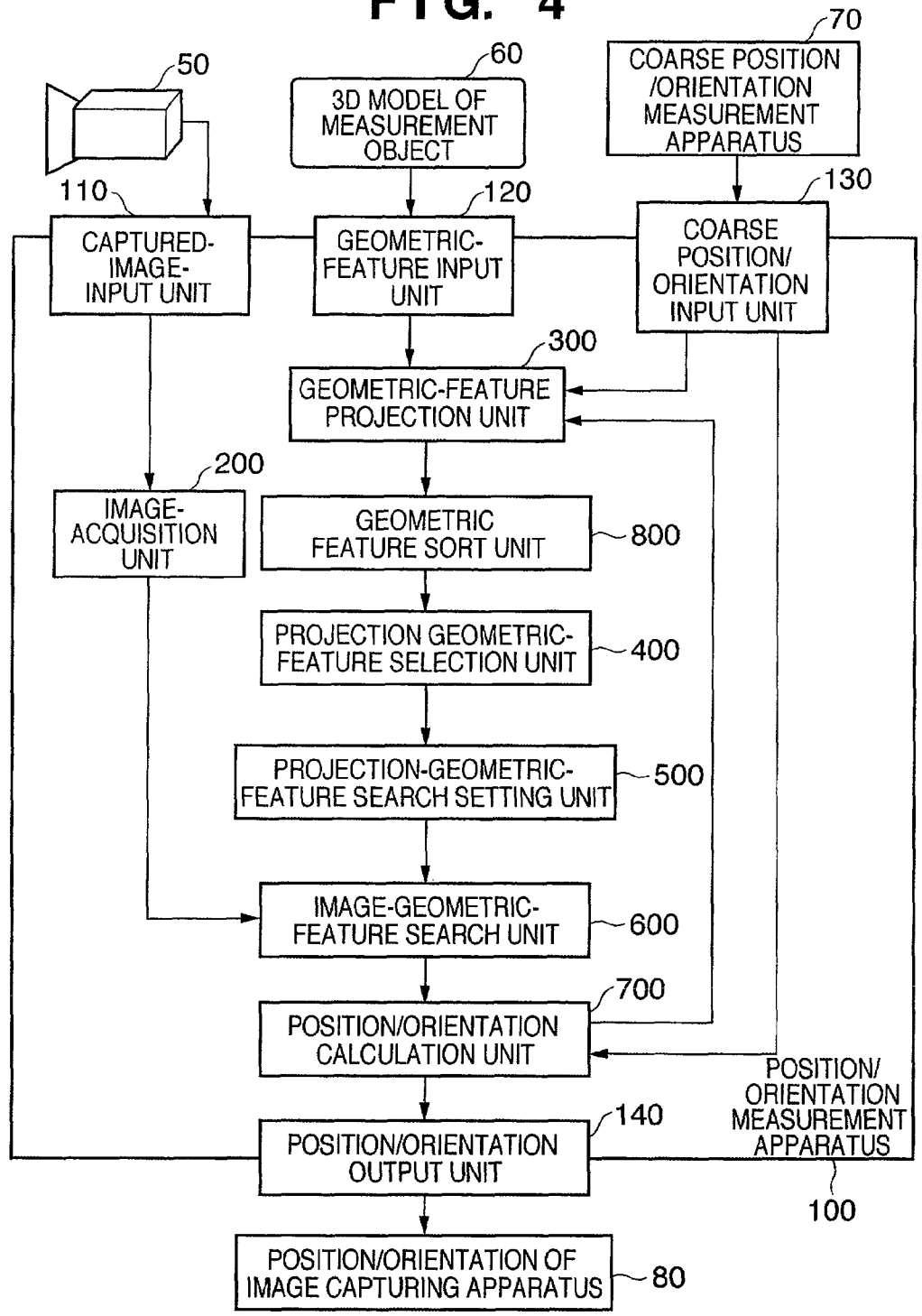
FIG. 4 is a diagram illustrating the functional configuration of a measurement apparatus according to an embodiment of the present invention.

FIG. 4 is a flow chart illustrating the configuration of the measurement apparatus 100 of Embodiment 3, which has a geometric feature sort unit 800 representing geometric feature sorting means that determines the sequence of processing of the model. It should be noted that the configuration shown in FIG. 4 is same as the configuration of Embodiment 1 (FIG. 1) except for the geometric feature sort unit 800. Therefore, explanations provided herein will focus on processing performed by the geometric feature sort unit 800.

In Embodiment 3, it is assumed that if the geometric features are line segments, the geometric feature sort unit 800 computes the length of the projection geometric features in the captured image and sorts them from longest to shortest. Moreover, if dots and pixels distributed in the vicinity thereof are used as geometric features, sorting can be carried out using distribution values defining pixel distribution. It should be noted that, despite the fact that explanations herein refer to the length of the projection geometric features, in actual practice, to be able to achieve the effects of Embodiment 3, it is sufficient to perform sorting such that line segments permitting efficient image geometric feature detection during position and orientation estimation can be processed in a preferential manner.

For instance, there is a method of sorting that raises the degree of priority of the geometric features that permit easy image geometric feature detection in captured images. During initialization, all the degrees of priority are set to "undetected", after which all the projection geometric features are subjected to detection once. Next, the difference in density between adjacent pixels obtained during image geometry detection in the captured image is saved and sorting is carried out using this density difference. Moreover, this can be applied to cases, in which geometric features whose degree of priority is set to "undetected" are dynamically changed based on edge search processing if the direction of gaze changes and the observed geometric features become different. Moreover, the depth direction of the geometric features from the camera viewpoint position is also computed during conversion to the camera coordinate system in the geometric-feature projection unit 300. Accordingly, the geometric feature sort unit 800 carries out sorting by starting from features whose depth direction is close to the viewpoint, as a result of which edges what have significant influence on position and orientation accuracy can be processed first.

Moreover, it is also possible to use a method, in which a table holding sort results for a predetermined number of geometric features is saved in the geometric feature sort unit 800 and results exceeding the predetermined number are not saved, which is effective in terms of making processing more efficient.

Embodiment 4

An example, in which the measurement apparatus 100 described in the above-described embodiments is applied to mixed reality, is shown next.

Figure 5:
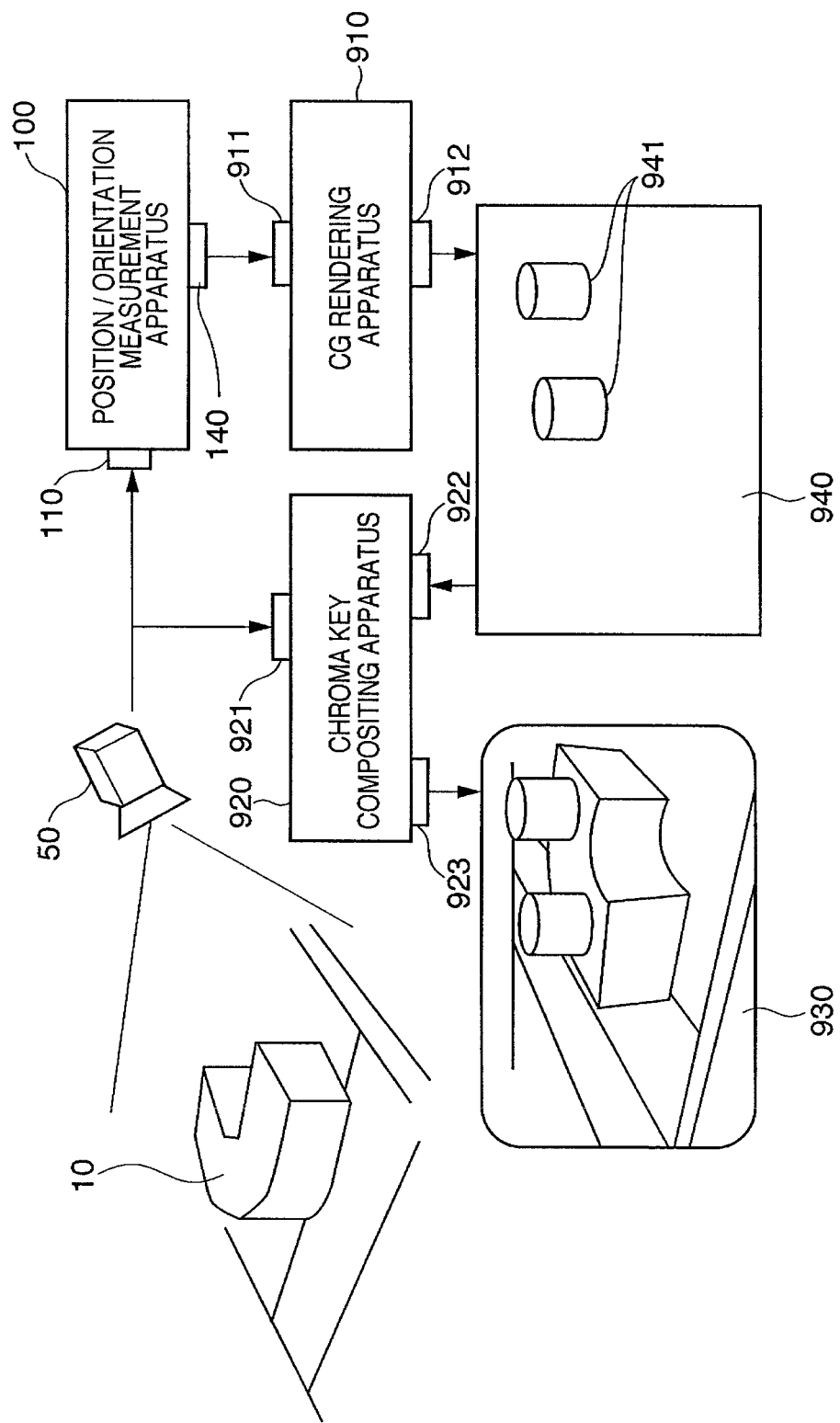
FIG. 5 is a diagram illustrating the configuration of a measurement apparatus according to an embodiment of the present invention when used in a mixed reality application.

FIG. 5 is a schematic diagram illustrating the way the measurement apparatus 100 according to Embodiment 5 is applied to compositing of virtual object CG with a measurement object based on mixed reality technology. In FIG. 5, the measurement object 10 is a 3D object of a known shape. It is assumed that the constituent surface, which has a curved surface, is comprised of multiple faces. Moreover, the angle at which the measurement object is viewed is not specified in a predetermined way.

The image captured by the image-capturing apparatus 50 is inputted to the measurement apparatus 100 by the captured-image-input unit 110. Moreover, it is also connected to an image input unit 921 of a chroma-key compositing apparatus 920 in order to composite images. It is assumed that a 3D model 60 of the measurement object 10 has already been registered in the measurement apparatus 100.

When the measurement object 10 is present in the captured image, the measurement apparatus 100 outputs the results of position and orientation measurement of the image-capturing apparatus 50 using the output unit 140. The CG rendering apparatus 910 accepts the position and orientation of the image-capturing apparatus 50 from the measurement apparatus 100 via an input unit 911. The CG rendering apparatus 910 uses the position and orientation inputted from the input unit 911 as the CG viewpoint position and subjects virtual objects to CG rendering, outputting the rendered image to a CG image output unit 912. Here, the CG rendering apparatus 910 renders two cylinders 941, which are virtual objects, on top of the measurement object 10 and outputs an image such as the virtual object CG image 940 using the CG image output unit 912. It should be noted that the background color of the virtual object CG image 940 is a chroma-key-matching color set by the chroma-key compositing apparatus 920.

The chroma-key compositing apparatus 920 accepts the captured image of the image-capturing apparatus 50 from the image input unit 921 as input and gets the virtual object CG image 940 from a chroma-key target image input unit 922. The chroma-key compositing apparatus 920 then composites the virtual object CG image 940, in which regions having the chroma key-matching color are made transparent, with the captured image, and outputs the resultant composite image 930 using the chroma-key composite image output unit 923. As a result of the above-described processing, the outputted composite image 930 turns into an image, in which there are two cylinders 941, that is, virtual objects, rendered on top of the captured measurement object.

In accordance with Embodiment 5, actual components can be viewed on screen together with virtual components designed using CAD in order to check for component-to-component interference. Moreover, this is preferable because the above-mentioned checks can be easily performed by an operator by viewing the composite image 930 on a head mount display (HMD: Head Mount Display).

If the direction of gaze is set in the same direction as that of the image-capturing apparatus at such time, the position and orientation of the head unit can be matched with the real space being observed, which makes it possible to expect an improvement in operability based on mixed reality. Furthermore, the measurement apparatus 100, CG rendering apparatus 910, and chroma-key compositing apparatus 920 can be realized using a single computer program.

In accordance with the above-described embodiments, the position and orientation of the image-capturing apparatus can be obtained in an efficient manner without being affected by the relative position relationship between the image-capturing apparatus and measurement object.

Other Embodiments

While the above-described exemplary configuration was explained as an exemplary embodiment of the present invention, in general, it is sufficient to use an apparatus that embodies the processing means of the present invention and a camera. For instance, the same effects are obtained if processing is executed in the form of a program implementing the processing configuration of the present invention on a cellular phone or portable computer. Furthermore, two-dimensional services presenting information related to neighboring facilities and locations can also be implemented using the position and orientation measurement results.

Although some embodiments have been described in detail above, the present invention can contemplate embodiments such as, for instance, systems, devices, methods, programs, or storage media, etc. Specifically, it may be applied to a system composed of a plurality of devices, as well as applied to an apparatus constituted by a single device.

It should be noted that the present invention includes cases, wherein the functionality of the above-described embodiments is realized by supplying a software program to the system or apparatus directly or remotely and allowing the computer of the system or apparatus to read and execute the supplied program code. In such a case, the supplied programs correspond to the flow charts depicted in the drawings of the embodiments.

Therefore, due to the fact that the functional processing may be implemented on a computer, the program code installed on the computer may be an implementation of the present invention.

In such a case, as long as it possesses the program's functionality, embodiments may take various forms, such as object code, interpreter-executed programs, script data supplied to the OS, etc.

The following media are suggested as computer-readable storage media used for supplying the program. For example, it may be a Floppy™ disk, a hard disk, an optical disk, a magneto-optical disk, an MO, a CD-ROM, a CD-R, a CD-RW, a magnetic tape, a non-volatile memory card, ROM, or a DVD (DVD-ROM, DVD-R), etc.

In addition, connecting to an Internet homepage using a browser on a client computer and downloading the computer program of the present invention from the homepage onto a hard disk or another recordable medium is suggested as a method of supplying the program. In such a case, the downloaded program may be a compressed file with self-installation functionality. Moreover, it can also be implemented by dividing the program code constituting the program of the present invention into a plurality of files and downloading the respective files from different homepages. In other words, WWW servers that allow a plurality of users to download program files used to implement the functional processing of the present invention on the computer are also included in the present invention.

Moreover, it may take the form of encrypting the program of the present invention, storing it on CD-ROMs or other storage media, and disseminating it among users. In such a case, users who meet certain criteria may be allowed to download key information used to decrypt the encryption from a homepage through the Internet and use the key information to execute the encrypted program and install the program on a computer.

Moreover, in addition to implementing the above-described functionality of the embodiments based on the execution of read-in program by the computer, the functionality of the embodiments may be implemented based on the instructions of the program in cooperation with an OS, etc. running on the computer. In such a case, the OS, etc. carries out either part or all of the actual processing and the above-described functionality of the embodiments is implemented based on such processing.

Furthermore, either part or all of the above-described functionality of the embodiments may be implemented by writing the program read from the recordable media to memory provided in an expansion unit connected to the computer or an expansion board inserted into the computer. In such a case, after the program has been written to the expansion board or expansion unit, the CPU, etc. provided in the expansion board or expansion unit carries out either part or all of the actual processing based on the instructions of the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2007-117563, filed Apr. 26, 2007, which is hereby incorporated by reference herein in its entirety.

What is claimed is:

1. A measurement apparatus for measuring a relative position and orientation of an image-capturing apparatus with respect to a measurement object, wherein the measurement apparatus comprises:
   an image acquiring unit configured to acquire a captured image of the measurement object from the image-capturing apparatus;
   a projection unit configured to project geometric features of a 3D model of the measurement object onto the captured image based on a position and orientation of the image-capturing apparatus to obtain projected geometric features;
   a selecting unit configured to select projected geometric features to be used in calculation of the relative position and orientation from the projected geometric features obtained by the projection unit based on a positional relationship between the projected geometric features in the captured image;
   a search unit configured to search the captured image for image geometric features corresponding to the projected geometric features selected by the selecting unit; and
   a calculating unit configured to calculate the relative position and orientation of the image-capturing apparatus with respect to the measurement object using positions of the projected geometric features selected by the selecting unit and the corresponding image geometric features searched out by the search unit, wherein the geometric features are detected based on a pixel density between search start points and search corresponding points, and a point where a density gradient of an adjacent pixel exceeds a predetermined threshold value is detected as a position of a geometric feature.

2. The apparatus according to claim 1, wherein the projection unit is configured to obtain the projection geometric features by projecting onto a captured image, line segments constituting a 3D model of the measurement object and corresponding to image geometric features that can be detected in the captured image.

3. The apparatus according to claim 1, further comprises a setting unit configured to set up, for the selected projection geometric features, one or more points in the captured image and obtain a search direction at each point, and
   wherein the search unit searches the captured image for the image geometric features based on the points and the direction of search set up by the setting unit.

4. The apparatus according to claim 1, wherein the projection geometric features are line segments and the selecting unit is configured to select a projection geometric feature which is at least a predetermined distance away from at least one previously selected projection geometric feature.

5. The apparatus according to claim 1, wherein the projection geometric features are line segments and the selecting unit is configured to select a projection geometric feature which has a length greater than a predetermined threshold in the captured image.

6. A control method for measurement apparatus for measuring a relative position and orientation of an image-capturing apparatus with respect to a measurement object, wherein the method comprises:
   acquiring a captured image of the measurement object from the image-capturing apparatus;
   projecting respective geometric features of a 3D model of the measurement object onto the captured image based on a position and orientation of the image-capturing apparatus to obtain projected geometric features;
   selecting projected geometric features to be used in calculation of the relative position and orientation from the projected geometric features obtained based on a positional relationship between the projected geometric features in the captured image;
   searching the captured image for image geometric features corresponding to the projected geometric features; and
   calculating the relative position and orientation of the image-capturing apparatus with respect to the measurement object using positions of the selected projected geometric features and the corresponding image geometric features corresponding which has been searched out, wherein the geometric features are detected based on a pixel density between search start points and search corresponding points, and a point where a density gradient of an adjacent pixel exceeds a predetermined threshold value is detected as a position of a geometric feature.

7. A non-transitory computer-readable storage medium storing a program for causing a measuring apparatus to perform a control method according to claim 6.

* * * * *